June 3, 1941.  C. H. LYON  2,244,073
METHOD OF RIVETING
Filed Oct. 25, 1938  2 Sheets-Sheet 1
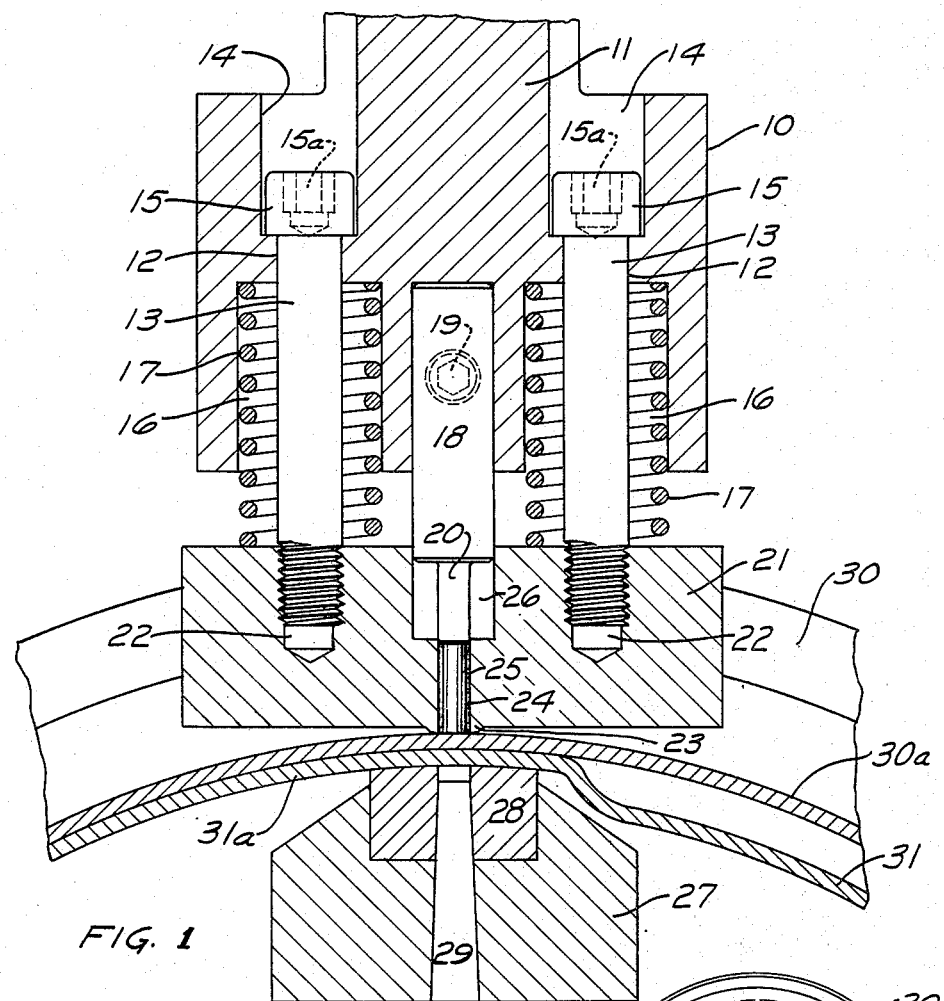
FIG. 1
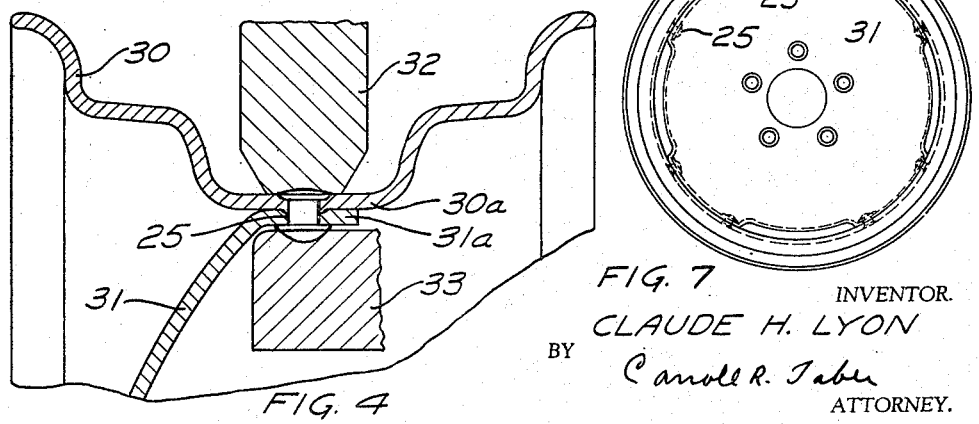
FIG. 4
FIG. 7
INVENTOR.
CLAUDE H. LYON
BY Carroll R. Taber
ATTORNEY.

June 3, 1941.                C. H. LYON                2,244,073
                          METHOD OF RIVETING
             Filed Oct. 25, 1938            2 Sheets-Sheet 2
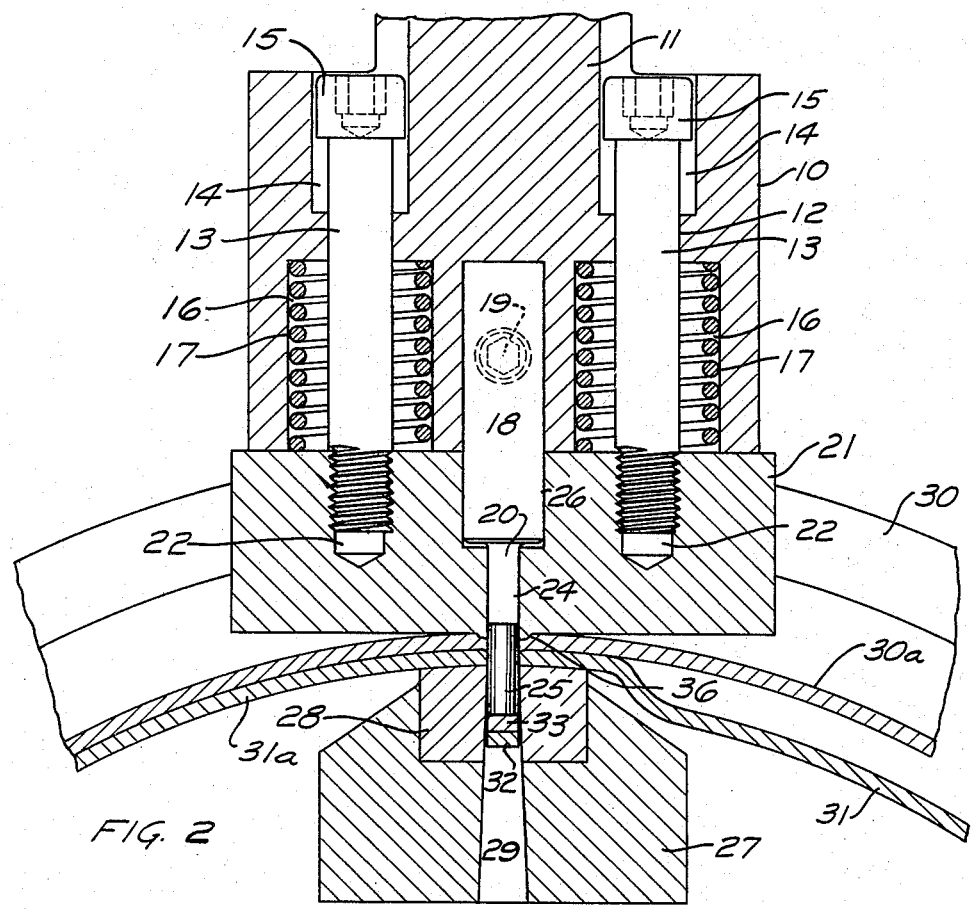
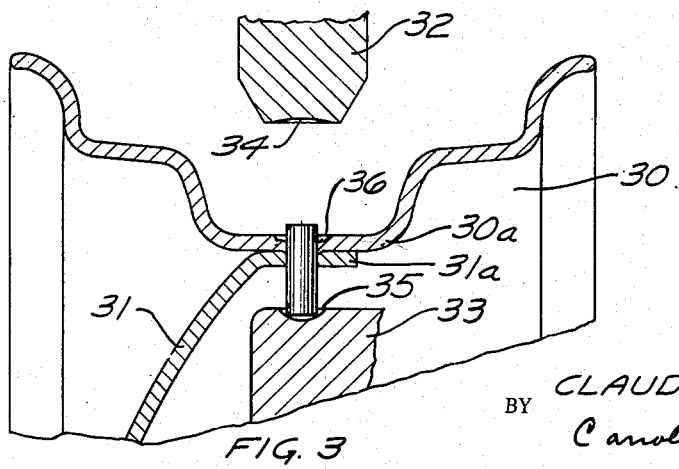
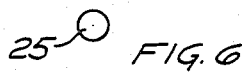
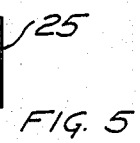
INVENTOR.
CLAUDE H. LYON
BY Carroll R. Taber
ATTORNEY.

Patented June 3, 1941

2,244,073

UNITED STATES PATENT OFFICE 2,244,073

METHOD OF RIVETING

Claude H. Lyon, Lansing, Mich., assignor to Motor Wheel Corporation, Lansing, Mich., a corporation of Michigan Application October 25, 1938, Serial No. 236,865

2 Claims. (Cl. 78—46)

This invention relates to the art of riveting, and particularly to a novel method of riveting a plurality of metal plates together.

In general, the usual method of riveting two parts together comprises drilling, or punching, or otherwise forming complementary rivet holes in the parts to be secured together, assembling the parts in proper relationship with the holes in aligned positions, inserting a rivet having a head on one end in the holes, and thereafter upsetting the headless end of the rivet to form a head thereon.

This method necessitates the employment of rivets having heads at one end. Such rivets must be manufactured prior to their insertion in the rivet holes, and are relatively costly. The method above outlined also necessitates the separate formation of rivet holes in the parts to be riveted, which is an operation that it is advisable to dispense with, if possible. Both of these requirements increase the time necessary to assemble and rivet the parts together, and add to the cost of manufacture.

In the method of riveting described above it is customary to lubricate the punch in order to allow it to be easily retracted after it forms the rivet holes and to prevent undue wear of the punch. Some of this lubricant inevitably collects in the rivet holes around the shank and beneath the heads of the rivets, and even a thorough washing will not entirely remove it. When the finished article is painted or enameled the lubricant which remains often causes unsightly blisters, particularly if the paint or enamel is baked on in an oven.

It is an object of this invention to provide a method of riveting whereby it is possible to employ cheaper rivets than were formerly necessary. Another object is to increase the speed and facility with which two parts may be riveted together and incidentally reduce their cost by providing a method requiring fewer operations to assemble the parts in proper relationship. Another object is to provide a method in which it is unnecessary to provide a lubricant for the punch.

Still another object of the invention is to provide a method of fastening two metal parts together wherein an aperture is formed therethrough and a fastener is inserted coincident with the operation of forming the aperture. Still another object is to provide a method whereby the fastener is securely held in place by flowing the metal of the parts to be held together tightly against the fastener after it is inserted in the parts. Another object is the provision of a method of inserting a bar of metal such as a driving or locating stud in a metal plate and securely fastening said stud in place.

Broadly the invention comprises a method of inserting a bar of metal into one or more metal parts, wherein the bar to be inserted is also the punch for forming the hole in the metal parts, thereby combining the steps of forming the hole and inserting the bar into but one operation.

Because the ends of the punch are usually to be headed over, it must be of a relatively soft material, such as mild steel, and may be of even softer material than the metal strips through which it is driven. Ordinarily the diameter of the punch is approximately the same as the combined thickness of the metal strips that are riveted together, although these proportions need not be strictly adhered to.

In the drawings—

Figure 1 is a fragmentary cross-sectional view of a punch assembly and die block, showing the various parts in position prior to the driving of the punch through two portions of a vehicle wheel which are to be riveted together;

Figure 2 is a view similar to Figure 1, but showing the parts in the positions occupied after the punch is forced through the work;

Figure 3 is a cross-sectional view showing the work in position in a riveting press prior to the formation of the rivet heads;

Figure 4 is a cross-sectional view similar to Figure 3 but showing the various parts in the positions they occupy after heads are formed on the punch;

Figures 5 and 6 are respectively elevation and end views of the headless punch used for riveting the parts together; and Figure 7 is a view of a complete vehicle wheel riveted by the method of this invention.

The invention is shown as applied to the assembly of a wheel body and a wheel rim, but it will be obvious from the specification that its use is not limited to vehicle wheels but may be employed in a variety of cases where it is desired to rivet two or more parts together, or where it is desired to insert a metal bar in a single metal plate.

The method of this invention is performed by a punch and die mechanism, the essential parts of which are shown in the drawings. The parts shown are embodied in presses of conventional construction, and the construction of such presses and the location of the punches and dies therein will be obvious to those skilled in the art.

Figures 1 and 2 show the punch and its operation, the views being identical except for the difference in relative positions of the various parts at different times during the cycle of operation. The numeral 10 indicates the punch assembly in its entirety. A ram extension 11 is secured to the ram of a press (not shown). The ram extension 11 is provided with two vertically extending holes 12 which receive a pair of stripper bolts 13. The holes 12 are counterbored at their upper ends to provide recesses 14 of a slightly greater diameter than the heads 15 of the stripper bolts. The heads 15 of the stripper bolts 13 are provided with sockets 15a for the reception of an adjusting wrench. The holes 12 in the ram extension are also counterbored at 16 to receive a pair of stripper springs 17 which surround the stripper bolts 13.

In the center of the ram extension 11, and extending upwardly from the lower face thereof, is a recess which receives the body 18 of a punch driver. The body 18 of the punch driver fits snugly in the recess and is secured therein by means of a laterally extending bolt 19 which passes through the body 18 and is threaded into the ram extension 11. The lower end of the punch driver is necked down to form a portion 20 of the same diameter as the punch 25.

A combination stripper, rivet holder, and punch guide 21 is secured by means of the stripper bolts 13 to the ram extension 11. As will be seen in the drawings, the stripper bolts are threaded into tapped holes 22 in the stripper. The lower surface of the stripper 21 is flat except for a small circular boss 23 which is formed adjacent the center thereof. The purpose of this boss will appear more fully hereinafter.

Extending vertically upward through the stripper 21 and located centrally of the boss 23 is a hole 24 of a diameter to snugly yet slidably receive a punch 25. The stripper 21 is counterbored from the top to form a recess 26 of the same diameter as the body 18 of the punch driver. The two parts 18 and 20 of the punch driver fit snugly in the respective recesses 26 and 24, but are slidable therein. The stripper springs 17 are of a length such that they are always under compression when located in their recesses and the stripper 21 is secured to the ram extension 11.

Mounted rigidly on the frame of the press below the punch assembly is a die block 27. Inserted in a recess in the upper face of the die block is a die button 28 of hardened steel. A bore 29 extends downwardly through the button 28 and die block 27 and is aligned with the hole 24 in the stripper 21. The upper end of the bore 29 is of substantially the same diameter as the bore 24 but the latter increases slightly in diameter as it extends downwardly whereby to form a slightly tapered opening through the die button and die block.

Numerals 30 and 31 designate respectively a rim and wheel body of a vehicle wheel, which in this instance comprise the parts to be secured together. Their cross sections are shown in Figures 3 and 4, and they are shown in Figure 1 in proper assembled relationship and ready to receive the punch. The rim 30 has a channel base 30a and the wheel body 31 has a peripheral flange 31a, both of which parts are imperforate.

Figures 3 and 4 show the tools for performing the operation of heading both ends of the punch 25. Mounted rigidly on the base of the press is an anvil 33 having a cup shaped recess 35 in its upper face. This recess 35 is of substantially the same shape as the head to be formed on the lower end of the punch. Secured rigidly to the ram of the press is a riveting punch 32 which is located directly above and in alignment with the recess 35 in the anvil 33. The lower end of the punch 32 is recessed slightly at 34 in order to shape the upper head of the rivet.

In the structure shown in Figures 1 and 2, the die block and die button are fixed on the press frame and the punch assembly reciprocates vertically with the ram. In Figures 3 and 4 the anvil 33 is fixed to the body of the press and the riveting punch 32 reciprocates vertically.

To secure the wheel body 31 and rim 30 together by the method of this invention, rim 30 and wheel body 31 of the wheel are assembled in the positions shown in the various figures, a punch 25 is inserted in the hole 24 in the stripper 21, and the wheel bodies are placed between the punch assembly and the die button 28 as shown. At the start of the operation the punch assembly is spaced a substantial distance from the two parts of the wheel. Power is then supplied to the ram of the press, and the punch assembly moves downwardly with all of the parts remaining in the relative positions shown in Figure 1 until the boss 23 contacts the top surface of the channel base 30a. This position of the punch assembly is illustrated in Figure 1. Continued downward pressure on the ram then forces the ram extension and punch driver to move downward relatively to the stripper 21 and stripper bolts 13, against the action of the stripper springs 17. The punch driver 20 thereby pushes the punch 25 out of the hole 24 and through the two metal strips 30a and 31a. Two slugs sheared from the wheel body and rim during this operation are indicated at 32 and 33 in Figure 2. It will be noted that this operation actually shears metal from the parts 30a and 31a and does not merely displace it to one side.

As soon as the lower face of the ram extension strikes the top face of the stripper 21, further relative movement of the parts of the punch assembly 10 is prevented, but the ram continues to descend for a short distance and the boss 23 is forced into the metal, thereby forming a slight cavity 36 in the plate 30a about the punch, as shown in Figure 2. The metal is crowded in and jammed against the punch, thereby securely holding the latter in the metal strips. Not only is a cavity formed in plate 30a, but the metal of plate 30a is bent downwardly under the pressure of the boss 23 and it forms a complementary cavity in the plate 31a. Thus the two plates are interlocked and a joint even stronger than a conventional riveted joint is formed. Figure 2 indicates the extreme lowermost position of the punch assembly 10. The punch assembly is then moved upwardly, and due to the action of the stripper springs 17, the ram extension 11 and punch driver 20 are forced away from the stripper 21 until the heads 15 of the bolts 13 strike the bottoms of their recesses 14, whereupon the entire punch assembly moves away from the work as a unit.

Because the metal surrounding the hole 24 in which the punch is mounted is jammed tightly against the punch, the latter remains fastened securely to the work and is pulled out of the stripper 21.

The punch 25 is given lateral support over its entire surface by the walls of the hole 24 in the stripper 21, so that there is no possibility of its distortion when it is driven home by the punch driver. Furthermore, the velocity of the punch during its movement through the metal strips is high so that the action is a straight shearing action rather than a flowing and bending action of the plates 30a and 31a, such as would be the result of driving a hardened awl through the strips. A punch of much softer material than the parts to be riveted can be used with perfect satisfaction in this method.

The wheel is next removed from the punch press shown in Figures 1 and 2 and placed in the press of Figures 3 and 4. The lower end of the punch 25 rests in the recess 35. Power is supplied to the ram (not shown) to which the riveting punch 32 is secured, thereby driving the riveting punch 32 downwardly. As a result the opposite ends of the punch 25 are upset to form heads which hold the two parts of the wheel solidly together.

It will be noted that the recess 36 formed in the upper surface of the rim 30 by means of the boss 23 forms a perfect cavity to receive all of the metal of the upper head formed on the punch 25 (see particularly Figure 4). This is essential in a vehicle wheel because the interior surface of the rim must be smooth in order to prevent unnecessary abrasion and premature wear of the tire. In the method herein disclosed, slight variations in the lengths of the punches will not change the configuration of the head within the channel of the wheel rim 30 because the punch driver always leaves the punches extending exactly the same distance into the rim channel. Any excess of material in the punch can be accommodated in the other head.

It will be apparent that if desired the lower face of plate 31a can also be indented in the same manner as at 36 in plate 30a, by forming a boss on button 28 similar to boss 23. Then by employing a punch of the proper length, both heads can be flush with the plates.

In certain cases it may be unnecessary or undesirable to form heads on the ends of the punch. The punch may then be left unheaded, and though such a construction does not give as strong a joint as is formed when the punch is provided with heads, still relative movement of the plates in their planes is prevented. Considerable force will be required to separate the plates, even if there are no heads on the punch, because of the tight fit between the plates and punch.

The method of this invention may also be used for inserting a stud in a single piece of metal, if desired.

It will be obvious that the method described in this application is a decided improvement over the previous methods because of the elimination of the step of punching holes in the parts prior to the insertion of the rivet, and also because of the elimination of the necessity for providing specially made rivets. A still further advantage of this method is that the punching operation can be performed without any lubricant, as each punch is used but once and need not be removed from the metal strips.

Throughout this specification the term "imperforate metal" is intended to designate metal which is imperforate in the zone through which the punch is driven. It will be obvious that the metal part or parts may be perforated in other zones if desired, prior to the insertion of the punch.

The scope of the invention is indicated in the appended claims.

I claim:

1. The method of securing imperforate metal parts together by means of a rivet of greater length than the combined thickness of the parts, which comprises holding said parts in apposition, driving a headless rivet of uniform cross-section through said parts to shear therefrom sections of the same cross-section as the cross-section of the rivet, thereafter indenting and flowing the metal of one of said parts in a zone immediately surrounding the rivet tightly against the sides thereof to lock the rivet tightly in place and to form an annular recess surrounding said rivet to receive the rivet head, and finally heading over the ends of the rivet.

2. The method of securing imperforate metal parts together by means of a rivet, which comprises driving a headless rivet of uniform cross-section through said parts to shear therefrom sections of the same cross-section as the cross-section of the rivet and at the same time accurately positioning one end of said rivet with respect to an exterior surface of one of said parts, thereafter indenting and flowing the metal of said last mentioned part in a zone immediately surrounding said rivet to lock the rivet tightly in place and to form an annular recess therein to receive the rivet head, and finally flowing into the recess the end of the rivet adjacent the recessed surface.

CLAUDE H. LYON.